United States Patent [19]

Ivey et al.

[11] Patent Number: 4,941,317
[45] Date of Patent: Jul. 17, 1990

[54] NOSE BULLET ANTI-ICING FOR GAS TURBINE ENGINES

[75] Inventors: Paul C. Ivey, West Chester, Ohio; John M. Owen, Brighton, England

[73] Assignees: Rolls-Royce plc; Ruston Gas Turbines Limited, both of England

[21] Appl. No.: 337,468

[22] Filed: Apr. 13, 1989

[30] Foreign Application Priority Data

Apr. 14, 1988 [GB] United Kingdom ............... 8808785

[51] Int. Cl.$^5$ .............................................. F02C 7/047
[52] U.S. Cl. .................................. 60/39.093; 416/95
[58] Field of Search ................... 60/39.093, 39.07; 415/143, 175, 177, 180; 416/94, 95, 245 R; 244/134 R, 134 B

[56] References Cited

U.S. PATENT DOCUMENTS

| | | | |
|---|---|---|---|
| 2,618,433 | 11/1952 | Loos et al. | 415/115 |
| 3,663,118 | 5/1972 | Johnson | 415/116 |
| 3,925,979 | 12/1975 | Ziegler | 60/39.07 |
| 4,485,619 | 12/1984 | Moore et al. | 60/39.093 |
| 4,757,963 | 7/1988 | Cole | 60/39.093 |

*Primary Examiner*—Donald E. Stout
*Attorney, Agent, or Firm*—Oliff & Berridge

[57] ABSTRACT

A flow inducing means 110 for use in an anti-icing system for a nose bullet 10 of a gas turbine engine of the type in which hot gas is caused to flow along the center of a rotating tube 7,62 towards the nose bullet 10 to heat it, and cooled air is centrifuged to the surface of the bore of the tube 7,62 and is displaced rearwardly along the tube. The tube 7,62 is open at its rear end, and the flow inducing means 110 is positioned adjacent the open end. The flow inducing means 110 comprises a plurality of radial vanes 111 which enters in a radially inwards direction and the vanes 111 are shaped and positioned to redirect the gas axially along the center of the tube 7. The flow inducer 110 may include a shroud 115 which has a circumferential inlet opening and an axial facing outlet 116. The shroud may serve as a flow separator which separates the incoming hot gas from the cooled gas exiting the tube.

7 Claims, 3 Drawing Sheets

NOSE BULLET ANTI-ICING FOR GAS TURBINE ENGINES

BACKGROUND OF THE INVENTION

The present invention relates to anti-icing ef rotating nose bullets of gas turbine engines.

Heating of rotating nose bullets presents particular problems. For example, electrical heaters cannot be incorporated, as they could be with static nose bullets, without the use of slip rings, or other such complications, for carrying the heater current across the interface between static and rotating parts of the engine. Other methods have been tried, for example, ducting hot air from other parts of the engine to the nose bullet and allowing it to impinge thereon, or to form a film of hot air over the internal surface thereof. Once again this has had the disadvantages that the hot air either has been allowed to escape from the nose bullet into the air stream entering the engine compressor where it distorts both the pressure and temperature profiles of the air, or has had to be ducted away to another part of the engine to avoid heating the compressor discs. This adds complexity to the engine design.

Some shapes of nose bullet e.g. pointed, or ogival, have been found to be satisfactory without specific anti-icing provisions, but the problem still remains for blunt nose bullets, which are preferred in some engine installations because of their shorter length.

We have now found that it is possible to achieve satisfactory anti-icing of the whole of the spinning nose bullet, provided that a relatively small area adjacent the axis of rotation is maintained free of ice.

British Patent No. 2046843 discloses a very successful way of anti-icing a rotating nose bullet. The method described in British Patent No. 2046843 makes use of the temperature difference which occurs between different axial positions along the engine. In this way, energy can be made available to produce a rotating 'thermosyphon' effect using the nose bullet as the cooler and using a region downstream of the nose bullet as the heat input. Hot gas is caused to flow along the centre of a hollow rotating tube or drive shaft of the engine towards the nose bullet. The denser cooled air is centrifuged against the wall of the bore of the shaft and flows back along the shaft to exit from the rear of the shaft.

The above mentioned British Patent also discloses an embodiment which uses a hollow rotating shaft which is closed off at the front end by a nose bullet assembly and open at the rear. It is explained in the patent that although the open ended tube is not per se a thermosyphon it works in a similar manner to a thermosyphon in that the centrifugal forces on the different densities of gas pump the hot gases down the centre of the tube to heat the nose bullet and pump the cooled gases rearwards against the shaft wall.

Whilst the anti-icing system of British Patent No. 2046843 works extremely well, it has been found that in some engine arrangements there is insufficient flow of hot air down the centre of the rotating tube. This is particularly so where the source of hot gases is a swirling mass of gases from the vicinity of the turbine components. It has been found that in engine arrangements of the latter mentioned type where the rotor causes the inflowing air to swirl, the flow of gases along the centre of the shaft is seriously impaired and may be stopped completely.

SUMMARY OF THE INVENTION

An object of the present invention is to provide means for de-swirling the flow of air into the centre rotating tube or shaft.

According to the present invention a gas turbine engine which has a rotating nose bullet assembly, a rotating hollow tube which is effectively blanked off at the front end by the nose bullet assembly and is open at the rear end, an anti-icing system in which hot gas is caused to flow along the axis of the tube towards the nose bullet assembly to heat the nose bullet assembly and is cooled thereby, and the cooled air is caused to flow back along the tube towards the open end as a radially outer flow, and means for supplying hot gas to the open end of the tube, the improvement comprising flow inducing means located adjacent the open end of the tube, the flow inducing means having an inlet for receiving swirling inflowing hot gas, and flow directing means for redirecting the in flowing hot gas along the axis of the tube, the flow and directing means comprising a plurality of stationary vanes which have a portion extending radially and a portion extending in an axial direction towards the open end of the tube.

The tube is preferably closed at its downstream end and has holes is its wall to allow entry of the heated air.

In a preferred form of the invention the whole of the self induced flow takes place in a central tube and which is connected to, and closed at the front end by, a central region of the surface of the nose bullet. The tube extends rearwards to the downstream end of the engine. This system provides a very efficient anti-icing system with a minimum of additional complication. The central tube may, in this embodiment, comprise, at least in part, a hollow engine main shaft, which would preferably be the innermost main shaft. The rear end of the tube is open to allow some of the cooler air from the radially outer part of the interior of the shaft to flow out of the shaft and to allow flow of hot air into the shaft on the axis thereof.

The diameter of the tube preferably increases along its length, and may change gradually or may change in a series of steps.

DESCRIPTION OF THE DRAWING

Examples of the invention will now be more particularly described with reference to the accompanying drawings in which.

DESCRIPTION OF THE PREFERRED EMBODIMENT

Figure 1:
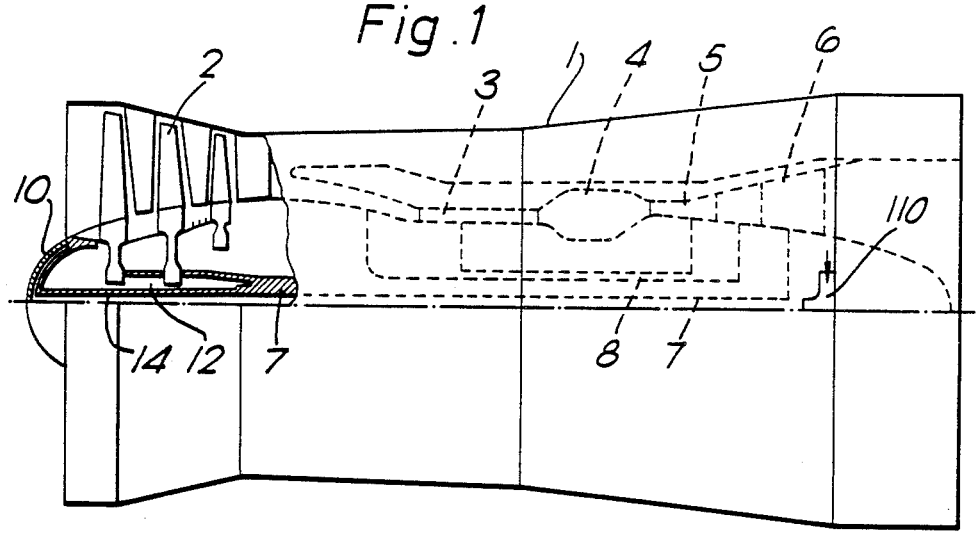
FIG. 1 is part section through a gas turbine engine having an anti-icing system and incorporating a flow inducer according to the present invention.
Figure 2:
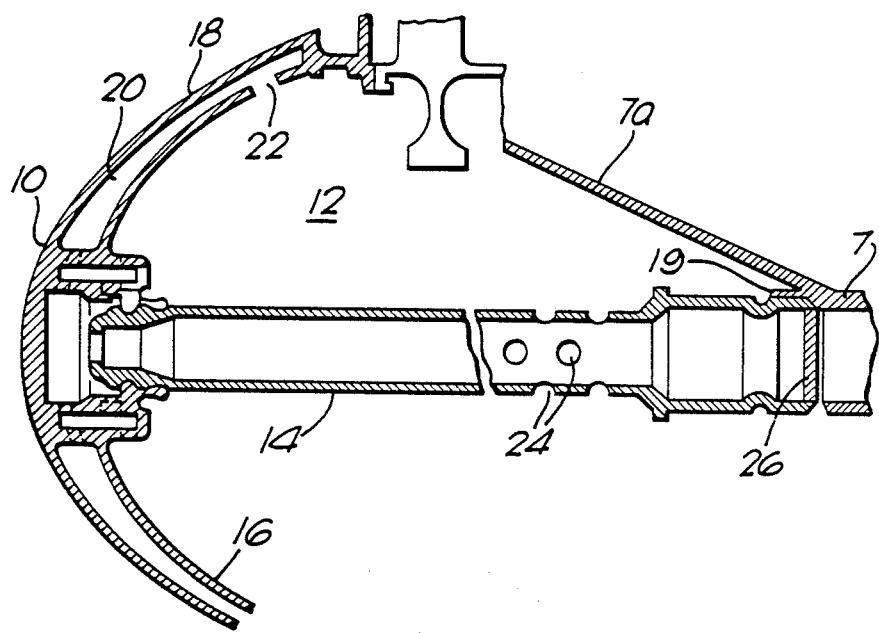
FIG. 2 is an enlarged view of the compressor and the nose bullet anti-icing system of the engine of FIG. 1.
Figure 3:
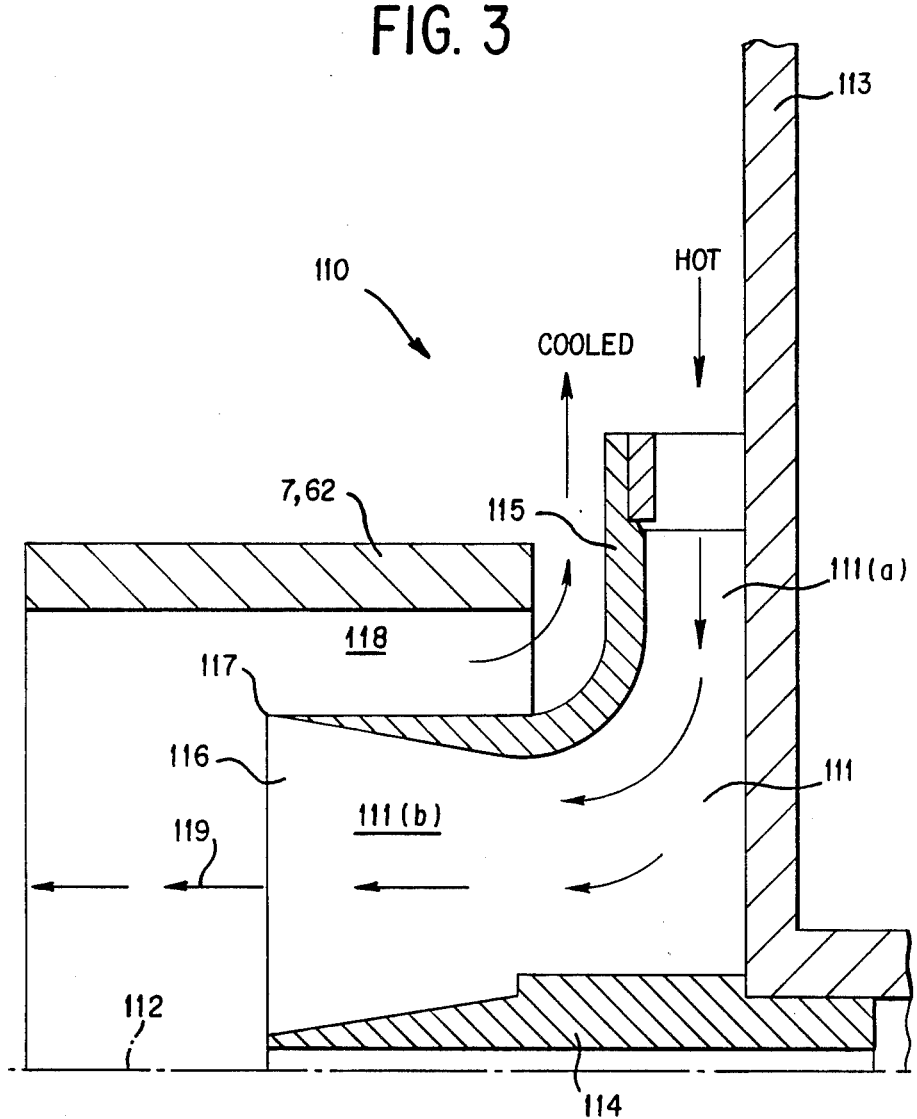
FIG. 3 shows a detail section of the flow inducer of FIG. 1.

Referring now to FIGS. 1 to 3 there is shown in FIG. 1 a bypass gas turbine engine 1 including a low pressure compressor 2, a high pressure compressor 3, combustion equipment 4, a high pressure turbine 5, and a low pressure turbine 6. The low pressure compressor 2 is driven by the low pressure turbine 6 through a low pressure shaft 7, and the high pressure turbine 5 drives the high pressure compressor 3 through a high pressure shaft shown diagrammatically at 8. There is also provided a flow inducer 110 to direct hot gases from the engine into the shaft 7. The exhaust gases produced by the engine pass to atmosphere through nozzle means (not shown) at the downstream end of the engine.

At the upstream end of the engine, and forming the radially inner wall of the annular air inlet to the low pressure compressor, is a nose bullet assembly 10. The nose bullet assembly 10, being subject to ice formations, requires an anti-icing system for preventing the formation of large deposits of ice which may break off and pass into the inlet to the compressor causing damage.

Tests have now shown that only the central portion of the nose bullet need be heated for anti-icing purposes, because if ice is prevented from building up on the central portion, centrifugal force will prevent excessive build up of ice on the remaining surface area. It has been found that only about three or four square inches of the nose bullet surface centred on the engine axis need be heated to keep the whole nose bullet clear of an excessive build up of ice.

In order to provide heat to the central portion of the nose bullet a rotating tube induced flow has been found to be effective. This uses the centrifugal force on air at different temperatures within a substantially closed system to produce a circulation of air in which the warmer air remains close to the axis of rotation while the cooler air is forced to the radially outer walls.

To provide this effect in the engine of FIG. 1, an anti-icing system has been devised which uses the rise in temperature across the whole engine to heat the central region of the nose bullet. In the embodiment, shown in FIG. 2, the nose bullet assembly 10 is provided with a central tube 14 the rearward end of which is connected to the front end of a hollow drive shaft 7 which connects the LP turbine to the LP compressor by means of a forwardly extending wall portion 7a. The shaft 7 is open at its rear end and is provided with the device 110 for including and de-swirling the air flow (see FIG. 3). The tube 14 is blanked off at its rear end by a plate 26 to prevent hot gas at very high temperatures from the downstream end of the engine entering the chamber 12 from the drive shaft 7.

Referring to FIG. 2 the nose bullet assembly 10 has inner and outer skins 16,18 defining a space 20 therebetween. The upstream end of the tube 14 is connected to the inner skin 16, and the downstream end is driven by shaft 7 through a splined connection 19. The tube 14 communicates with the space 20 so that relatively hot air from within the tube 14 impinges on the central portion of the outer skin 18 of the nose bullet. This air is cooled by the nose bullet and as its density increases it is centrifuged outwardly in the space 20 creating a lower pressure zone at the upstream end of the tube 14. The cooled air leaves the space 20 through a series of apertures 22 formed in the inner skin 16 and passes into the chamber 12 at the radially outer wall thereof.

As this air moves rearwards along the radially outer wall portion 7a of the chamber it picks up heat from the wall, and as its density decreases it will tend to be pushed radially inwardly by the flow of denser, cooler air from the space 20. The heated air enters the tube 14 at the downstream end of the chamber 12 through holes 24 in the tube wall and flows forwardly to the nose bullet 10. This circulation provides a continuous supply of heated air to the central portion of the surface of the nose bullet and has been found to be effective in most conditions to maintain the nose bullet free of significant formations of ice.

There will also be a degree of heating of the air in tube 14 by virtue of contact with plate 26 which is heated by the very high temperature gas in the drive shaft 7. In some applications it is not necessary to have very hot gases proceeding along shaft 7 into tube 14.

As shown in FIGS. 1 and 3, hot air is taken from the vicinity of the turbine components of the engine and is fed in generally radially towards the centre of the engine. The high speed rotation of the turbine rotors induces the mass of hot air to swirl and it has been found that this swirl can effectively impair or completely stop the hot air reaching the inside of the shaft 7. Whilst the self induced flow will still take place within the shaft 7 without significant quantities of fresh hot gas reaching the open end of the tube the efficiency of the self induced flow is considerably less that it could be. Accordingly the present invention provides a means for de-swirling the incoming hot air and for directing it axially along the centre of the shaft 7.

Referring particularly to FIG. 3 the device for de-swirling the air is shown. The de-swirler 110 comprises a plurality of radial vanes 111 equispaced around the central axis 112 of the engine. The vanes 111 are fixed to stationary structure 113, e.g. the front bulkhead of the tail cone of the engine so that the vanes are located adjacent the open end of the shaft 7. Each vane 111 has a radial portion 111(a) and an axial portion 111(b). The vanes are carried at their centre by a stationary hub 114. A shroud 115 is provided to cover the vanes. The shroud 115 acts as a flow separator and defines a circumferential inlet for receiving hot swirling air from the vicinity of the turbine components, and defines an axial outlet for directing said the hot air axially along the centre-line axis of the shaft 7.

The cylindrical outlet 116 of the shroud 115 is generally conical so as to improve flow and prevent turbulent vortices downstream of the lip 117. The lip 117 is located at a radius of the boundary layer at which the outer laminar flow of cooled air (shown by arrow 118) meets the hot core flow shown by arrow 119.

Experiments have shown that in some embodiments of the invention it may not be necessary to provide the shroud 115 because at very high rotational speeds of the shaft 7 the cooled air is accelerated outwards at the open end of the shaft 7. In this latter arrangement it may still be necessary to separate the hot incoming air from the cooler outflow by defining the inlet and outlet paths to avoid too much mixing. In some arrangements mixing of the hot and the cooled air streams may be tolerated.

Figure 4:
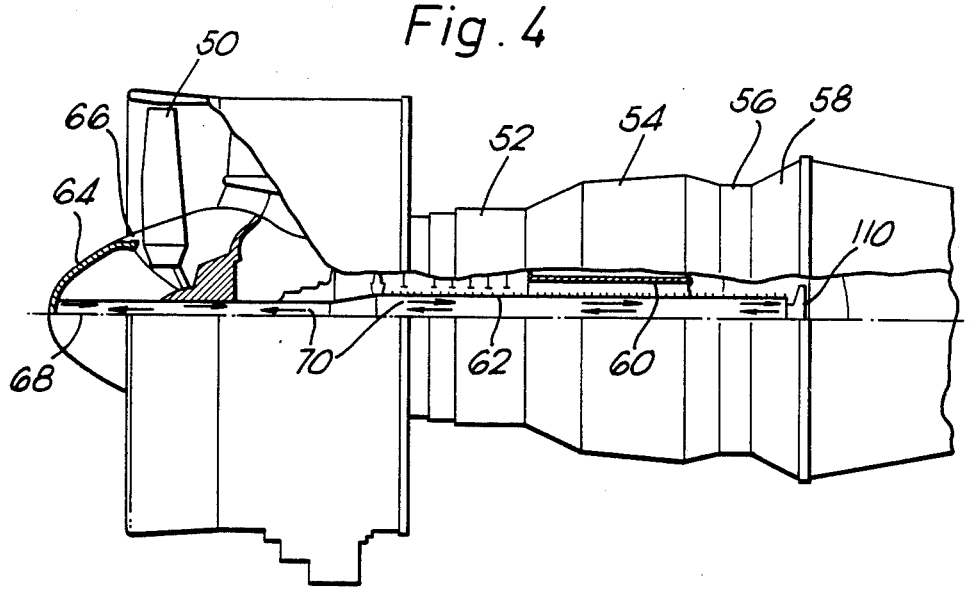
FIG. 4 is a diagrammatic view of a gas turbine engine sectioned to illustrate an alternative anti-icing system incorporating the improvement of the present invention.
Figure 5:
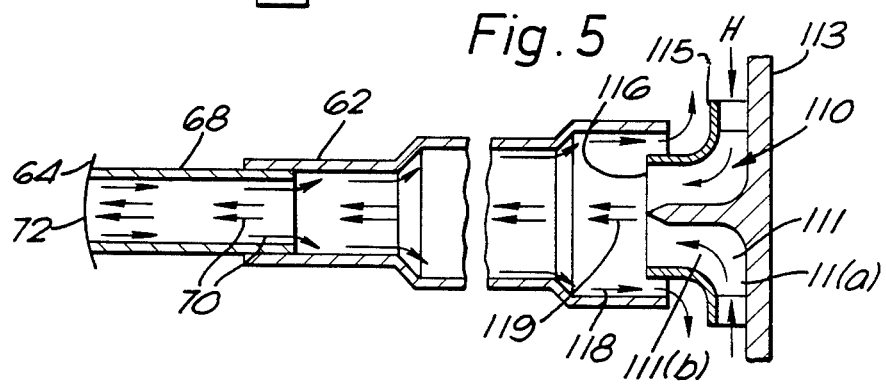
FIG. 5 is an enlarged diagrammatic representation of the shaft of the engine of FIG. 4 illustrating the self induced flow.
Figure 6:
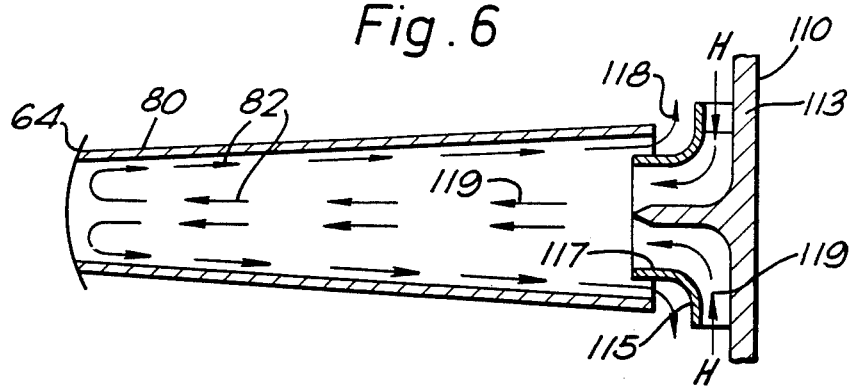
FIG. 6 is a diagrammatic representation of an alternative form of shaft.

To deal with harsher conditions however, which may require more heat to be supplied to the nose bullet than can be supplied by the arrangement shown in FIGS. 1 and 2, an alternative system using the basic principle of the present invention can be used. In the alternative system, which is illustrated in FIGS. 4 to 6, the central tube is completely closed at the front end by the internal surface of the nose bullet, which is single skinned, and the tube is constituted by the shaft 7 which connects the LP turbine to the LP compressor. The shaft is open ended at the rear end and extends rearwardly, increasing in diameter, to the turbine end of the engine where air at much higher temperature is available for heating the nose bullet tube and the self induced flow takes place entirely within the shaft 7.

Referring now to FIGS. 4 to 6 there is shown a gas turbine engine having a fan 50, a high pressure compressor 52, a combustion system 54, a high pressure turbine 56, and a low pressure turbine 58. The high pressure compressor 52 and the high pressure turbine 56 are drivingly interconnected by a high pressure shaft 60, and the fan 50 and the low pressure turbine 58 are drivingly interconnect by a low pressure hollow shaft 62 which rotates co-axially within the high pressure shaft. The engine has a nose bullet 64 which is connected by bolts 66 to the fan 50 for rotation therewith.

In this embodiment of the invention the low pressure shaft 62 increases in diameter in steps from the upstream end of the engine to the downstream end, and a tube 68 is provided which is connected between the upstream end of the shaft 62 and the nose bullet 64, and is of a diameter equal to, or less than the diameter of the upstream end of the shaft 62. As can be seen more clearly in FIG. 4 the self induced flow is created wholly within the tube 68 and the shaft 62, and is indicated by the arrows 70.

Located at the turbine end of the shaft 62 is a de-swirler 110 which is the same as that shown in FIG. 3.

The tube 68 is connected to the nose bullet is such manner that it is closed at its upstream end by a region 72 of the internal surface of the nose bullet adjacent the axis the engine. Hot air in the tube 68, supplied from the de-swirler 110, thus contacts the cold nose bullet at the front end of the tube and is cooled. The centrifugal force on this part of the air in the tube then becomes greater than that on the warmer air elsewhere in the tube, due to the increasing density of the air as its temperature falls. The cooler air is thus centrifuged to the radially outer part of the tube, allowing more warm air near the central axis of the tube to move into contact with the nose bullet and setting up a circulation in the tube.

Where the tube 68 is connected to the main shaft 62 there is an increase in diameter which promotes further radially outward flow of the cooled air due to the higher centrifugal force on it, and with further step changes in diameter of the shaft along its length, the cooled air is encouraged to flow rearwardly along the walls, first of the tube 68, and then of the shaft 62, until it reaches the downstream end of the shaft. During this flow the air is being heated, and when it reaches the downstream end of the shaft it flows around the end of the shaft and is centrifuged radially outwards thus improving the overall flow of air in the tube 68 and shaft 62.

Clearly, since the shaft 62 is open at its downstream end, there will be an interchange of air as the cooler air flows out from the shaft 62 and hot air is induced into the centre of the shaft 62. Thus, an open ended shaft will produce a thermosyphon effect although it may not per se act as a true thermosyphon.

The system thus provides a continuous supply of hot air to the central portion of the nose bullet for anti-icing purposes, but there is no flow of the hot air into the inlet air at the air intake at the front of the engine where it may constitute a danger by overheating the fan disc, or the discs of the first stages of the HP compressor. Thus much hotter air can be used from the downstream end of the engine and a more effective anti-icing can be achieved.

We have found that enough heat can be transmitted by the above described systems to heat a central area of the nose bullet, i.e. up to four square inches, so that no dangerous build up of ice occurs on any part of the nose bullet.

In an alternative construction illustrated diagrammatically in FIG. 6 the tube/shaft combination 80 is arranged to have a gradually increasing diameter from the front to the rear of the engine, which promotes the rearward flow of the cooler air on the inner surface of the tube/shaft wall as shown by arrows 82 and thus enhances the circulation of air.

We claim:

1. In a gas turbine engine which has a rotating nose bullet assembly, a rotating hollow tube which is effectively blanked off at the front end by the nose bullet assembly and is open at the rear end, an anti-icing system in which hot gas is caused to flow along the axis of the tube towards the nose bullet assembly to heat the nose bullet assembly and is cooled thereby, and the cooled air is caused to flow back along the tube towards the open end as a radially outer flow, and means for supplying hot gas to the open end of the tube, the improvement comprising flow inducing means located adjacent the open end of the tube, the flow inducing means having an inlet for receiving swirling inflowing hot gas, and flow directing means for redirecting the inflowing hot gas along the axis of the tube, the flow directing means comprising a plurality of stationary vanes which have a portion extending radially and a portion extending an axial direction towards the open end of the tube.

2. The improvement according to claim 1 wherein the flow inducing means comprises a shroud around the vanes, the shroud defining a circumferential inlet and an axial outlet.

3. The improvement to claim 2 wherein the outlet has a cylindrical lip which is located at a radius which separates the hot central flow of gas from the radially outer flow of cooled gas which flows back along the tube towards the open end.

4. The improvement according to claim 3 wherein the lip is located at the boundary layer of the laminar flow of cooled gas which flows back along the tube towards the open end.

5. The improvement according to claim 3 wherein the lip co-operates with a fixed central hub to define an axial directed annular outlet opening.

6. The improvement according to claim 3 wherein the lip is frusto conical.

7. The improvement according to claim 5 wherein the central hub is conical.

* * * * *